UNITED STATES PATENT OFFICE.

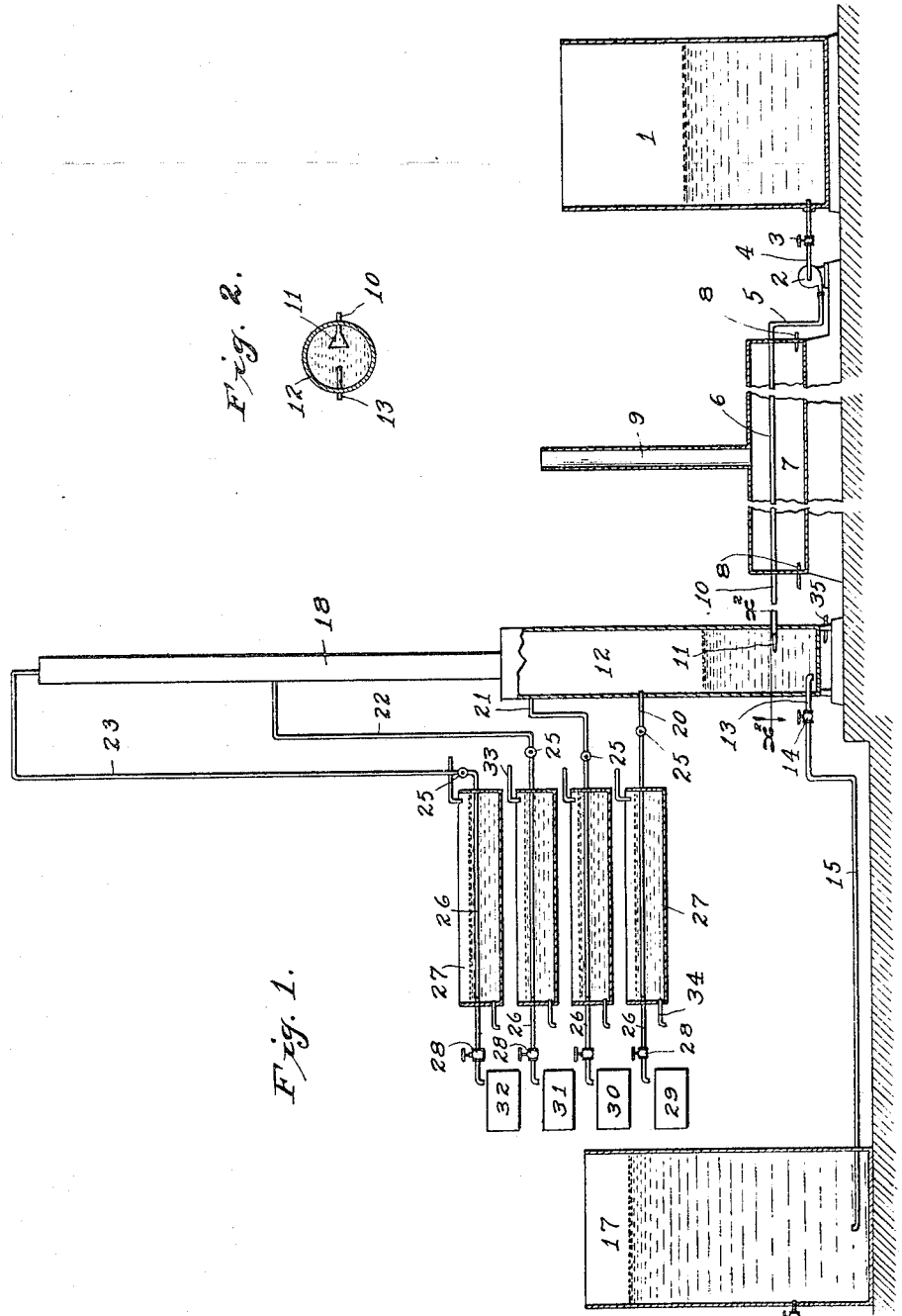

JACOB COLLINS, OF OLINDA, CALIFORNIA, ASSIGNOR OF ONE-HALF TO WM. J. TRAVERS, OF OLINDA, CALIFORNIA.

PROCESS OF TREATING PETROLEUM.

1,028,439.

Specification of Letters Patent.

Patented June 4, 1912.

Application filed September 19, 1911. Serial No. 650,238.

*To all whom it may concern:*

Be it known that I, JACOB COLLINS, a citizen of the United States, residing at Olinda, in the county of Los Angeles and State of California, have invented a new and useful Process of Treating Petroleum, of which the following is a specification.

This invention relates to the treatment of petroleum containing water and volatile matter such as gasolene, etc.

A large proportion of the crude oil produced in the United States, particularly in Southern California contains such a percentage of water that the oil is rendered unfit for use and is not accepted by the consuming and transportation companies. From two to three per cent. is the limit of water allowed in commercial oil, whereas the oil as produced runs often as high as 25% and occasionally as high as 50% or more of water. Attempts to settle out the water by heating the oil and allowing it to stand have been unsuccessful for the reason that the water is mixed with the oil in the form of an emulsion known as B. S. and on heating the oil to any moderate degree, there is no perceptible settling of the water, and on attempting to heat the oil to a greater degree so as to enforce the settling or drive off the water, the water tends to flash suddenly into vapor and to blow out the contents of the still and tank, this tendency of the oil on overheating being so far an effectual bar to settling out of the water by heating. The water has, however, been successfully separated from the oil by heating the oil while confined under pressure, so as to prevent the expansion and release of the water and then allowing the oil to gradually rise in a body or mass of oil at the same temperature so as to gradually relieve the pressure and allow the water vapor to escape from the surface of the body of oil gradually and without boiling, or violent expulsion of the water vapor. This process is set forth in the patent of William J. Travers, No. 1,004,219, granted September 26th, 1911, and the present process is based on the Travers process, the object of the present process being to provide for the recovery or conservation of the gasolene or other lighter volatile hydrocarbons that tend to pass off with the water vapors in the Travers process. This I accomplish by heating the petroleum to a temperature somewhat above the boiling point of water, while under pressure to maintain the water in liquid condition, gradually reducing the pressure on the petroleum, allowing the vapor of water and of the more volatile hydrocarbons to pass from the petroleum under such reduced pressure, condensing said vapors while under such reduced pressure and allowing the residual oil in the petroleum to rise in a mass of oil at the same temperature to gradually remove the hydrostatic pressure of the oil, the residue of the water contained in the petroleum being volatilized and allowed to escape at the surface of said mass. By this method of operation, I am enabled to carry out the process of elimination of water from the oil in the manner of the Travers process, while saving substantially all of the gasolene and other volatile hydrocarbon of value in the oil.

Other objects and advantages of the invention will appear hereinafter.

The accompanying drawing illustrates an apparatus suitable for carrying out my invention, and referring thereto:

Figure 1 is a vertical section of the apparatus somewhat diagrammatical. Fig. 2 is a horizontal section on line $x^2$—$x^2$ in Fig. 1.

1 designates the tank or source of oil supply for containing and supplying the crude oil or petroleum to which my process is to be applied. A pump 2 is connected at its inlet to the tank 1 through a valve 3 and pipe 4, and is connected at its outlet to a pipe 5 leading to a pipe, coil or heating element 6 contained within or arranged above a heating or combustion chamber 7, said chamber 7 having suitable heating means such as burners 8 and having a stack 9 for carrying off the products of combustion. A pipe 10 leads from the heating element or pipe 6 to a nozzle 11 in a vertical chamber or shell 12, said nozzle 11 being preferably flared in a horizontal direction as shown in Fig. 2, and is located somewhat above the bottom of the chamber 12. An outlet pipe 13 leads from the lower portion of the chamber 12, somewhat below the level of the nozzle and is provided with a valve 14 controlling communication to a pipe 15 leading into the bottom of a tank 17 in which the final elimination or reduction of the water content from the oil is effected. The vertical chamber or shell terminates at its upper end in a riser 18, the vertical chamber or shell 12 and riser 18 constituting a vertical stand pipe of considerable height so as to provide for considerable difference in density of the vapors at different levels in said stand pipe. Pipes are tapped from or connected to the said stand pipe at different heights for drawing off vapors of different density therefrom, for example, a pipe 20 may be tapped from the vertical shell 12 at about mid height thereof, another pipe 22 from about the mid height of the riser 18 and a pipe 23 from the top of the riser. Each of these pipes is provided with a valve 25 controlling communication therefrom to condenser coils or pipes 26 located in respective tanks 27, said coils or pipes 26 discharging through valve 28 to respective collecting tanks 29, 30, 31 and 32. Auxiliary heating means such as burner 35 may be provided for maintaining constant temperature in the vertical chamber 12. The tanks 27 will be provided with inlet 33 and outlet 34 for circulating water through said tanks.

The operation is carried out in the above described apparatus as follows: The crude oil, containing a considerable proportion of water and of comparatively volatile hydrocarbons, (say from 5 to 50% of water and from 3 to 5% of gasolene, etc.) is drawn from tank 1 or other supply means by pump 2 and pumped under pressure into the heating coil or pipe 6, in which it is heated somewhat above 212° F. I prefer to heat the oil to a temperature of about 240° F., the oil being pumped in at a pressure sufficient to maintain the water in liquid condition at that temperature. The heated oil flows into the stand pipe shell 12 and partly fills the same, say to the depth of about eight feet, the inlet 11 being about five feet below the surface. The vapor pressure in the stand pipe is maintained considerably in excess of atmospheric pressure, but somewhat below the pressure in the heating coils, this difference of pressure being represented substantially by the hydrostatic pressure of the column of liquid in the stand pipe above the inlet 11, the pressure in the stand pipe above the liquid being such that when the liquid rises to the surface and the hydrostatic pressure due to the column of liquid is removed, the gasolene and hydrocarbons boiling below 212° F., will become wholly converted into vapor and will pass off from the body of liquid and rise into the upper part of the stand pipe. A part of the water in the oil is also vaporized as it reaches the top of the liquid and passes along with the oil vapors. In this operation, the reduction of pressure on the water and gasolene takes place gradually, as they rise in the stand pipe and the pressure is such that only as they reach or approach the surface, do they pass into the form of vapor, thereby avoiding puking of the liquid in the stand pipe. The various valves 25 and 28 are so manipulated as to maintain a condition of pressure in the stand pipe in excess of atmospheric pressure, so as to prevent violent ebullition in the stand pipe and reduce as far as desired, the amount of water vapor carried over into the gasolene. The oil and water vapors that rise in the stand pipe, pass off through the respective pipes 20, 21, etc., and are condensed in the condenser lines 26 and the condensates flow into the respective tanks 29, 30, etc., when the stand pipe is made sufficiently high, say about thirty feet above the level of the liquid therein. I have found that the vapors of most of the lightest oil pass off through the pipes leading from the upper part of the stand pipe, and that the denser oil condensed from the vapors passing off through the lower pipes is not so light. A considerable proportion of water vapor passes along with the oil vapor in each condenser line and is condensed therewith, the proportion of water being greater in the lower lines. In the lower lines there is also considerable B. S. condensed. Valve 14 in pipe 15 is open so as to allow the heaviest portions of the oil to pass out through said pipe, this oil which flows through outlet 13 from the lower part of the stand pipe, is substantially free from gasolene and has lost much of its water, but it is still at full pressure and temperature, (the auxiliary heater 35 being used if necessary to maintain the temperature) and this oil, passing into the lower part of tank 17, rises gradually therein, the hydrostatic pressure therein being gradually reduced so that when it reaches or approaches the top of the liquid, the water expands to vapor by reason of its heat and passes from the surface of the liquid without the violent boiling heretofore referred to.

It will be noted that the oil is first allowed to rise in the stand pipe, so as to gradually reduce the pressure to a point in excess of atmospheric pressure but sufficiently low to permit the lighter oils to pass off vapor, such vapors being collected and condensed, and the oil remaining in the stand pipe is then allowed to rise in a second receptacle so as to gradually reduce the pressure to atmospheric pressure, allowing substantially all of the water remaining in the oil to pass off. The lighter hydrocarbons which are recovered by the above described operation are those which are more volatile than water.

What I claim is:

1. The process of treating petroleum containing water and light hydrocarbons more volatile than water, which consists in heating the petroleum to a temperature above 212° F., while under pressure sufficient to prevent volatilization of the water or light hydrocarbons, allowing the heated petroleum to rise in a column of petroleum to gradually reduce the pressure to a point in excess of atmospheric pressure, but sufficiently low to permit volatilization of the lighter hydrocarbons and part of the water from the vapor of said column, collecting and drawing off said lighter hydrocarbons, under the reduced pressure at the top of said column, and allowing the residue of petroleum from the column to rise in another column to gradually reduce the pressure to atmospheric pressure and permitting the water to volatilize from the surface of said second column.

2. The process of treating petroleum containing water and hydrocarbons more volatile than water, consisting in heating the petroleum to a temperature above 212° F., introducing the heated petroleum gradually, into the bottom of a heated column of petroleum at substantially the same temperature, causing the petroleum to gradually rise to the surface of said column so as to gradually reduce the hydrostatic pressure on the petroleum until the pressure becomes sufficiently low to permit volatilization of the said lighter hydrocarbons, collecting and drawing off such lighter hydrocarbons while maintaining a pressure on the surface of said column, in excess of atmospheric pressure, and then again introducing the petroleum gradually into the lower part of a mass of petroleum at substantially the same temperature and causing the petroleum to gradually rise to the surface of said mass of petroleum so as to gradually remove the hydrostatic pressure in the petroleum, and allowing the water to volatilize and escape from the petroleum as it reaches the surface of said mass.

In testimony whereof, I have hereunto set my hand at Los Angeles, California this 12th day of September, 1911.

JACOB COLLINS.

In presence of—
ARTHUR P. KNIGHT,
GLADYS RUSSELL.